Feb. 20, 1968     A. C. SAMPIETRO     3,369,625
SUSPENSION SYSTEM COUNTERACTING CHANGES IN VEHICLE ATTITUDE
DEPENDENT ON ENGINE CONDITION
Filed Dec. 20, 1965

ACHILLES C. SAMPIETRO
INVENTOR.

BY John R. Faulkner
Robert E. McCollum
ATTORNEYS

United States Patent Office 3,369,625
Patented Feb. 20, 1968

3,369,625
SUSPENSION SYSTEM COUNTERACTING
CHANGES IN VEHICLE ATTITUDE DE-
PENDENT ON ENGINE CONDITION
Achilles C. Sampietro, Bloomfield Hills, Mich., assignor
to Ford Motor Company, Dearborn, Mich., a corporation of Delaware
Filed Dec. 20, 1965, Ser. No. 514,820
9 Claims. (Cl. 180—73)

ABSTRACT OF THE DISCLOSURE

A substantially leakproof, yieldable container mounted between the sprung and unsprung masses of a vehicle is connected at all times to the intake manifold of an internal combustion engine so the pressure within the container substantially equals the intake manifold vacuum. Usually, the container is located at the rear of the vehicle where the pressure differential between the atmosphere and the container interior urges the vehicle sprung mass toward the unsprung mass. When the engine accelerates the vehicle, the manifold vacuum drops and the pneumatic forces exerted on the container decrease, thereby permitting the spring supporting the vehicle sprung mass to urge the rear of the vehicle upward against changes in vehicle attitude caused by the acceleration. Similarly, when the vehicle decelerates, a vacuum increase occurs within the container and the atmospheric pressure urges the sprung mass downward to counteract the inertial tendencies acting in the opposite direction. Coil-type springs for supporting the vehicle sprung mass can be located within the container to produce a compact suspension package. Alternatively, an inner container for compensating the sprung mass for changes in loading can be enclosed within the first container or a hydropneumatic strut that compensates for changes in loading and improves vehicle ride can be combined with the container.

This invention generally concerns vehicles powered by internal combustion engines and has particular reference to apparatus counteracting inertial forces and changes in load tending to change the attitude of the sprung mass of the vehicle.

The attitude of the sprung mass of a vehicle is the relationship between the height of the front and the rear of the vehicle body above the ground. Aesthetic preferences desire these heights substantially equal at all times. However, vehicle acceleration and increased or decreased loads tend to change vehicle attitude.

Acceleration of vehicles causes an inertial force equal and opposite to the acceleration forces. The inertial force acting on the sprung mass of a vehicle increases the load carried by the rear springs during acceleration by transferring weight from the front to the rear. Increased spring deflection necessary to carry this increased load changes vehicle attitude. This change in attitude is not only aesthetically undesirable but also constitutes a safety hazard by promoting loss of the driver's control over the vehicle.

The apparatus of this invention utilizes engine manifold vacuum to automatically counteract, in response to changes in engine power output, the sprung mass inertial forces caused by applying the engine power to the driving wheels. This apparatus comprises a yieldable container means operably connected between the sprung mass and the unsprung mass and means connecting the interior of the container means at all times with the vacuum in the intake manifold of the engine.

Located at the rear of the vehicle, the container means is mounted in a manner which utilizes atmospheric pressure to urge the sprung mass down toward the unsprung mass with a force proportional to the vacuum in the interior of the container means. Springs supporting the sprung mass are deflected by this force which is relatively large when the engine is idling. The springs are designed to produce a normal vehicle attitude while subjected to this relatively large force. Increasing the engine power output decreases the vacuum in the container means and the force exerted thereby. This force decrease counteracts the inertial forces acting on the sprung mass caused by acceleration, thereby tending to hold constant the attitude of the vehicle.

Similar results can be attained by mounting the container means at the front of the vehicle so the force urges the front of the sprung mass upwardly toward an extended member of the unsprung mass. The weight of the front of the sprung mass is carried by front spring means and this force. Decreasing the force increases the weight carried by the front spring means and the increased deflection caused thereby counteracts the acceleration inertial force.

Since intake manifold vacuum decreases as the torque supplied by the engine increases, the apparatus of this invention produces fairly uniform counteraction throughout the range of acceleration rates. Additional features provided by this apparatus counteract changes in attitude caused by changes in the static load carried by the vehicle sprung mass and improve ride characteristics.

FIGURE 1 of the drawings is a side elevational view of a vehicle comprising the apparatus of this invention;

Figure 1:
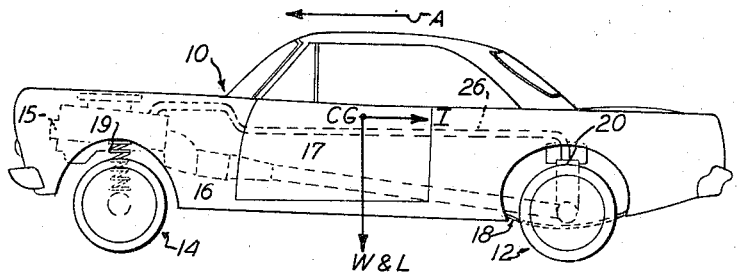

FIGURE 1 of the drawings shows a vehicle having a sprung mass comprising the vehicle body 10 and an unsprung mass comprising a rear axle assembly 12 and a front axle assembly 14. The vehicle is powered by internal combustion engine 15. A transmission 16 and drive shaft 17 transmit power produced by engine 16 to rear axle assembly 12 which also serves as a driving axle. Body 10 is supported by leaf spring means 18 mounted on rear axle assembly 12 and coil spring means 19 mounted on front axle assembly 14. A yieldable container means 20 is mounted between rear axle assembly 12 and body 10. Ordinarily one container means 20 is mounted at each side of the vehicle, although any reasonable number can be used. A conduit 26 connects the interior of container means 20 at all times with the intake manifold of engine 15.

Point CG represents the center of gravity of the sprung mass, and the arrow $W+L$ represents the weight of the sprung mass plus the static load it carries. Spring means 18 and 19 support the forces represented by arrow $W+L$. When the vehicle accelerates in the direction of arrow A, an intertial force acting on the sprung mass in the opposite direction is produced. This force, which can be considered as being concentrated at the center of gravity CG of the sprung mass, is represented in the drawing by arrow I. Inertial force I transfers weight to rear axle assembly 12, which can be mathematically shown by considering moments about front axle assembly 14. This weight transfer tends to increase the deflection of rear spring means 18 which would change the vehicle attitude.

Figure 2:
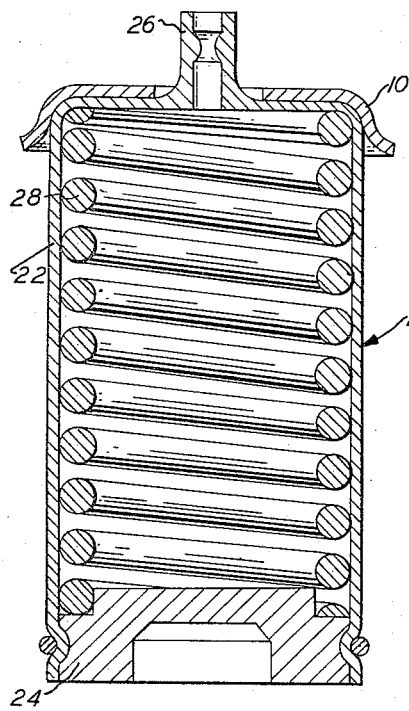
FIGURE 2 is a cross-sectional view of a portion of FIGURE 1 showing a yieldable container means of this invention that encloses a spring means.

As shown in FIGURE 2, container means 20 comprises a substantially leakproof, flexible envelope 22 sealed at its lower end by member 24 which is mounted on rear axle assembly 12. The top of envelope 22 is fixedly attached to sprung mass 10.

Since conduit 26 connects the interior of envelope 22 to the intake manifold of engine 16 at all times, the interior of envelope 22 always has an absolute pressure substantially equal to the absolute pressure existing in the intake manifold. When the engine is idling this interior pressure is relatively low, and the relatively large force exerted by the pressure differential between the atmosphere and the interior pressure on the area superposed by the interior of envelope 22 urges body 10 toward rear axle assembly 12. Spring means 18 is designed to provide a normal vehicle attitude when including spring deflection produced by this force.

When additional power is demanded from engine 16 to accelerate the vehicle, the increased absolute pressure in the intake manifold is transmitted via conduit 26 to the interior of envelope 22. This decreases the pressure differential existing between the interior of envelope 22 and the atmosphere, and the resulting decrease in force allows spring means 18 to urge vehicle body 10 away from rear axle assembly 12, thereby tending to counteract the inertial forces. In vehicles equipped with manual transmissions or automatic transmissions having varying gear ratios, orifices of various sizes (not shown) can be selectively positioned in a bleed line (not shown) to the interior of envelope 22 or in conduit 26 to provide a counteracting force varying with the gear ratio being used. Coil spring means 28 can be enclosed in envelope 22 to supplement or entirely replace spring means 18 if desired. A compact, easily assembled suspension system is provided when coil spring means 28 entirely replaces spring means 18.

Figure 3:
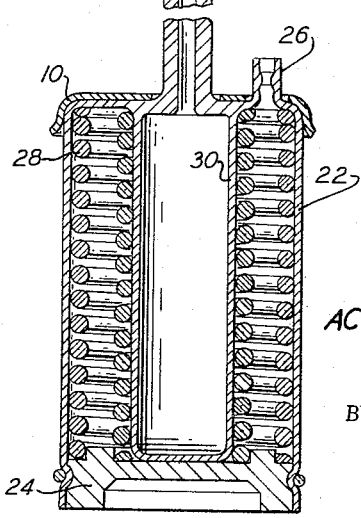
FIGURE 3 is a cross-sectional view similar to FIGURE 2 illustrating an embodiment of the invention comprising a yieldable container means enclosing both a spring means and a second yieldable container means; and, FIGURE 4 is a cross-sectional view of another embodiment showing a yieldable container means in combination with a telescoping hydropneumatic strut.

In the embodiment shown in FIGURE 3, envelope 22 encloses a second yieldable container means defined by inner envelope 30 which is also operably connected between body 10 and rear axle assembly 12. The interior of inner envelope 30 is connected via valve means 32 alternatively to the intake manifold through conduit 31 or the atmosphere through conduit 33. Valve means 32 is attached to body 10 and is controlled by valve lever 35 which is engaged by a rear axle assembly member 12a in the vicinity of rear axle assembly 12. Further details of construction and operation of valve means 32 can be found in U.S. Patents 2,981,551 or 3,116,918, for example.

When body 10 carries its design load, valve means 32 is positioned so the interior of inner envelope 30 is connected to the intake manifold through conduit 31. As the static load carried by the rear portion of vehicle body 10 increases, downward movement of body 10 positions lever 35 so that valve means 32 opens the interior of inner envelope 30 to the atmosphere, thereby increasing the absolute pressure therein. The resulting decrease in the pressure differential existing between the interior of inner envelope 30 and the atmosphere allows spring means 18 to urge the vehicle body 10 away from rear axle assembly 12, thereby counteracting changes in vehicle attitude caused by changes in vehicle static load.

The annular interior of envelope 22, which is connected at all times with the intake manifold of engine 15 tends to counteract the inertial forces in the manner described for the apparatus of FIGURE 2. In addition to counteracting attitude changes caused by vehicle load, the interior of envelope 30 controlled by valve means 32 and lever 35 also provides some counteraction of the inertial forces since downward movement of body 10 positions lever 35 so that the absolute pressure within envelope 30 increases. If desired, manual operating means for valve means 32 can be provided so the vehicle driver can control vehicle attitude according to his wishes.

Figure 4:
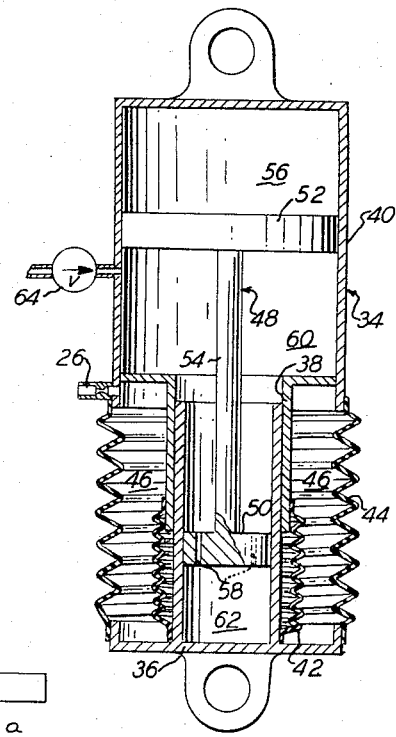

FIGURE 4 shows apparatus which combines means counteracting changes in attitude caused by inertial forces with a hydropneumatic strut 34 of the type described in U.S. Patent 3,002,743. Hydropneumatic strut 34 counteracts changes in attitude caused by changes in load and improves ride characteristics.

Strut 34 comprises an inner cylindrical ram member 36 telescoping into neck portion 38 of a housing 40. Ram member 36 is attached to the vehicle rear axle assembly 12 and housing 40 is attached to sprung mass 10. Flexible inner wall 42 and outer wall 44 sealingly connect member 36 with neck portion 38 and housing 40, respectively, thereby defining an annular interior 46. Interior 46 is connected at all times via conduit 26 with the intake manifold vacuum of engine 16.

Mounted within strut 34 is a differential piston 48 having a small land 50 slidable in ram member 36 and a large land 52 slidable in housing 40. Rod 54 fixedly connects lands 50 and 52. Upper chamber 56 formed by housing 40 and large land 52 can be charged with a compressible gas such as air to provide desirable damping characteristics as shown by U.S. Patent 3,002,743.

Orifices 58 in small land 50 connect intermediate chamber 60 formed between lands 50 and 52 with lower chamber 62 formed between land 50 and ram member 36. Intermediate chamber 60 and lower chamber 62 are charged with hydraulic fluid from a pressurized fluid source (not shown) through valve means 64.

Valve means 64 responds to changes in vehicle attitude caused by changes in the load carried by the sprung mass 10 in the manner described above for valve means 32. Controlled by valve means 64, fluid pressure in chambers 60 and 62 counteracts changes in attitude caused by changes in the vehicle load. In addition, orifices 58 control the flow of fluid between chambers 60 and 62 to dampen vibratory motion of sprung mass 10 as shown by U.S. Patent 3,002,743. Engine intake manifold vacuum applied to interior 46 counteracts changes in vehicle attitude caused by inertial forces in the manner disclosed above for the apparatus of FIGURE 2. Adjustment of the counteraction rate can be provided in the FIGURE 4 apparatus by changing the size or number of orifices 58.

I claim:

1. In an engine powered vehicle having a sprung mass and an unsprung mass, said unsprung mass including front and rear axle assemblies, apparatus which comprises
    yieldable container means operably connected between the spring mass and the unsprung mass, and
    means connecting the interior of the container means in open communication at all times with the vacuum in the intake manifold of the engine, said apparatus counteracting in response to changes in engine power output the inertial forces acting on the sprung mass.

2. The apparatus of claim 1 in which the container means encloses an inner yieldable container means operably connected between the sprung mass and the unsprung mass, and
    valve means responsive to changes in the load carried by the sprung mass, said valve means connecting the inner container means alternatively to the intake manifold or the atmosphere to control the vacuum in said inner container means in response to changes in the sprung mass load.

3. The apparatus of claim 2 in which the inner and outer container means each comprise flexible envelopes.

4. The apparatus of claim 3 which is operably connected between the rear axle assembly of the unsprung mass and the sprung mass, said apparatus comprising spring means disposed within the outer envelope, said spring means supporting the weight of the sprung mass and its load carried by said rear axle assembly plus the inertial forces acting on the sprung mass.

5. The apparatus of claim 4 in which the spring means is a coil spring.

6. The apparatus of claim 1 which operably contacts the rear axle assembly of the unsprung mass, said apparatus comprising spring means disposed within said container means, said spring means supporting the weight of the sprung mass and its load carried by said rear axle assembly plus the inertial forces acting on the sprung mass.

7. The apparatus of claim 1 in which the container means comprises a flexible envelope.

8. The apparatus of claim 1 which comprises a coil spring mounted within the yieldable container means.

9. The apparatus of claim 1 which comprises a hydropneumatic strut having a smaller portion telescoping into a larger portion, said portions operably connected respectively to the sprung mass and the unsprung mass and having a floating differential piston mounted therein, said container means surrounding said smaller portion and operably connected to the same mass as the smaller portion and to the larger portion.

References Cited
UNITED STATES PATENTS

| | | | |
|---|---|---|---|
| 2,934,335 | 4/1960 | Wolfram | 267—34 |
| 3,003,758 | 10/1961 | Francis | 267—34 |
| 3,031,204 | 4/1962 | DeLorean | 280—124 |
| 3,037,763 | 6/1962 | Steinhagen | 267—65 |
| 3,116,918 | 1/1964 | Francis | 267—65 |

A. HARRY LEVY, *Primary Examiner.*